(12) United States Patent
Krasner et al.

(10) Patent No.: US 11,573,833 B2
(45) Date of Patent: Feb. 7, 2023

(54) ALLOCATING CORES TO THREADS RUNNING ON ONE OR MORE PROCESSORS OF A STORAGE SYSTEM

(71) Applicant: EMC IP Holding Company LLC, Hopkinton, MA (US)

(72) Inventors: Jon I. Krasner, Coventry, RI (US); Edward P. Goodwin, Sturbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 554 days.

(21) Appl. No.: 16/527,697

(22) Filed: Jul. 31, 2019

(65) Prior Publication Data
US 2021/0034419 A1 Feb. 4, 2021

(51) Int. Cl.
*G06F 9/50* (2006.01)
*G06N 20/00* (2019.01)
*G06N 3/04* (2006.01)
*G06N 3/08* (2006.01)

(52) U.S. Cl.
CPC ............ *G06F 9/505* (2013.01); *G06N 20/00* (2019.01); *G06N 3/0445* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 7,716,642 B1* | 5/2010 | Michael | ............ | G06F 11/3624 717/124 |
| 7,756,787 B1* | 7/2010 | Hilton | ............ | G06Q 10/04 705/40 |
| 9,032,399 B1* | 5/2015 | Yang | ............ | G06F 9/45558 718/1 |
| 9,898,316 B1* | 2/2018 | Chalmer | ............ | G06F 9/45545 |
| 10,452,441 B1* | 10/2019 | Subramanian | ... | G06Q 10/06313 |
| 2015/0186185 A1* | 7/2015 | Zaroo | ............ | G06F 9/5022 718/104 |
| 2018/0113742 A1* | 4/2018 | Chung | ............ | G06F 9/5005 |
| 2020/0285899 A1* | 9/2020 | Chen | ............ | G06K 9/6257 |

* cited by examiner

*Primary Examiner* — Meng Ai T An
*Assistant Examiner* — Zujia Xu
(74) *Attorney, Agent, or Firm* — Muirhead and Saturnelli, LLC

(57) ABSTRACT

Allocating CPU cores to a thread running in a system that supports multiple concurrent threads includes training a first model to optimize core allocations to threads using training data that includes performance data, initially allocating cores to threads based on the first model, and adjusting core allocations to threads based on a second model that uses run time data and run time performance measurements. The system may be a storage system. The training data may include I/O workload data obtained at customer sites. The I/O workload data may include data about I/O rates, thread execution times, system response times, and Logical Block Addresses. The training data may include data from a site that is expected to run the second model. The first model may categorize storage system workloads and determine core allocations for different categories of workloads. Initially allocating cores to threads may include using information from the first model.

11 Claims, 9 Drawing Sheets

ALLOCATING CORES TO THREADS RUNNING ON ONE OR MORE PROCESSORS OF A STORAGE SYSTEM

TECHNICAL FIELD

This application relates to the field of computer systems and storage systems therefor and, more particularly, to the field of dynamically allocating processing cores to code threads running in a storage system.

BACKGROUND OF THE INVENTION

Host processor systems may store and retrieve data using a storage system containing a plurality of host interface units (I/O modules), physical storage units (e.g., disk drives, solid state drives), and disk interface units (disk adapters). The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical volumes. The logical volumes may or may not correspond to the physical storage units. Allowing multiple host systems to access the single storage system allows the host systems to share data stored therein.

A storage system may include multiple code threads that facilitate storage system operations and tasks, including exchanging data with hosts, fetching data from disks, etc. When the storage system is initially configured, each of the threads may be statically allocated a certain number of processing cores for performing processing on the storage system. Since the number of allocated cores is static, there is a tendency to allocate what is expected to be the maximum number of cores needed throughout the life of each thread. However, in some cases, the workloads of threads may be dynamic and vary significantly. Allocating a number of cores corresponding to a maximum expected workload is inefficient in instances where a thread becomes much less busy or even idle for some periods of time. Moreover, since core allocation is a zero sum game, allocating more cores to one thread results in allocating less cores to another thread. A possible solution would be to have an operator manually adjust core allocation while the storage system is running, but this is impractical because it would require that a user to monitor and manage core allocation over a period of time and intuitively know when to make proper resource allocation changes and adjust settings.

Accordingly, it is desirable to provide a mechanism for automatically and dynamically adjusting processor core allocation in in response to actual workloads of code threads running in a storage system.

SUMMARY OF THE INVENTION

According to the system described herein, allocating CPU cores to a thread running in a system that supports multiple concurrent threads includes training a first model to optimize core allocations to threads using training data that includes performance data, initially allocating cores to threads based on the first model, and adjusting core allocations to threads based on a second model that uses run time data and run time performance measurements. The system may be a storage system. The training data may include I/O workload data obtained at customer sites. The I/O workload data may include data about I/O rates, thread execution times, system response times, and Logical Block Addresses. The training data may include data from a site that is expected to run the second model. The first model may categorize storage system workloads and determine core allocations for different categories of workloads. Initially allocating cores to threads may include using information provided by the first model.

According further to the system described herein, a non-transitory computer readable medium contains software that allocates CPU cores to a thread running in a system that supports multiple concurrent threads. The software includes executable code that trains a first model to optimize core allocations to threads using training data that includes performance data, executable code that initially allocates cores to threads based on the first model, and executable code that adjusts core allocations to threads based on a second model that uses run time data and run time performance measurements. The system may be a storage system. The training data may include I/O workload data obtained at customer sites. The I/O workload data may include data about I/O rates, thread execution times, system response times, and Logical Block Addresses. The training data may include data from a site that is expected to run the second model. The first model may categorize storage system workloads and determine core allocations for different categories of workloads. Executable code that initially allocates cores to threads may use information provided by the first model.

According further to the system described herein, a storage system includes a plurality of interconnected director boards, each having a CPU and providing functionality for a host adaptor that exchanges data with one of more hosts coupled to the storage system, a disk adaptor that exchanges data with one or more physical storage units of the storage system, and/or a remote adaptor that exchanges data with one or more remote storage systems. The storage system also includes a memory coupled to the director boards and a non-transitory computer-readable medium containing software that is executed by at least one of the CPUs on at least one of the director boards. The software includes executable code that trains a first model to optimize core allocations to threads using training data that includes performance data, executable code that initially allocates cores to threads based on the first model, and executable code that adjusts core allocations to threads based on a second model that uses run time data and run time performance measurements. The training data may include I/O workload data obtained at customer sites. The I/O workload data may include data about I/O rates, thread execution times, system response times, and Logical Block Addresses. The training data may include data from a site that is expected to run the second model. The first model may categorize storage system workloads and determine core allocations for different categories of workloads. Executable code that initially allocates cores to threads may use information provided by the first model.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides an automated mechanism for dynamically allocating processing cores to code threads in a storage system by using predictive modeling, workload data, and performance data to initially allocate cores for threads and to adjust the allocated cores during run time.

Figure 1:
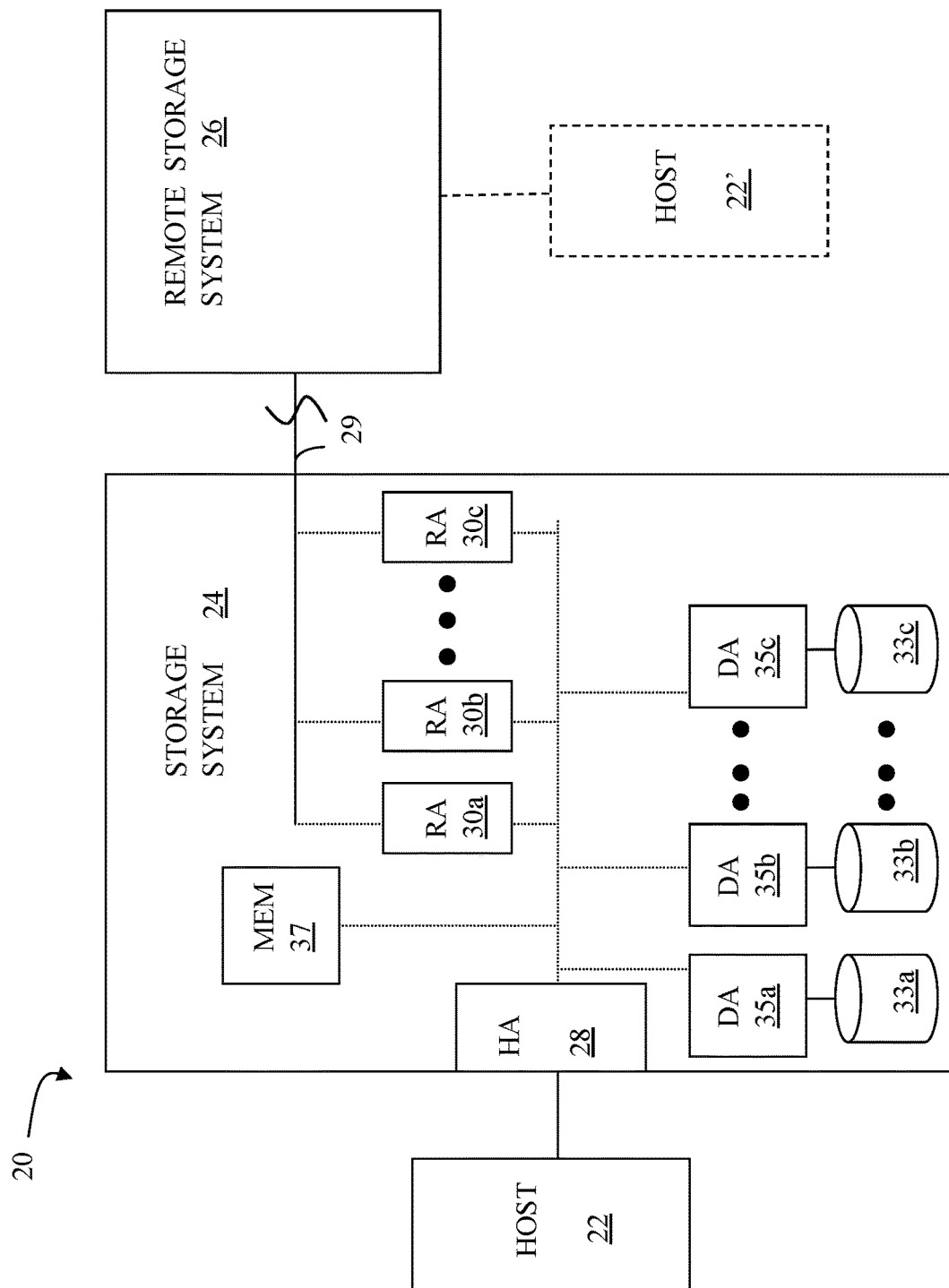
FIG. 1 is a schematic illustration of a storage system showing a relationship between a host and a storage system that may be used in connection with an embodiment of the system described herein.

FIG. 1 is a schematic illustration of a storage system 20 showing a relationship between a host 22 and a storage system 24 that may be used in connection with an embodiment of the system described herein. In an embodiment, the storage system 24 may be a Symmetrix or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, the transfer of data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
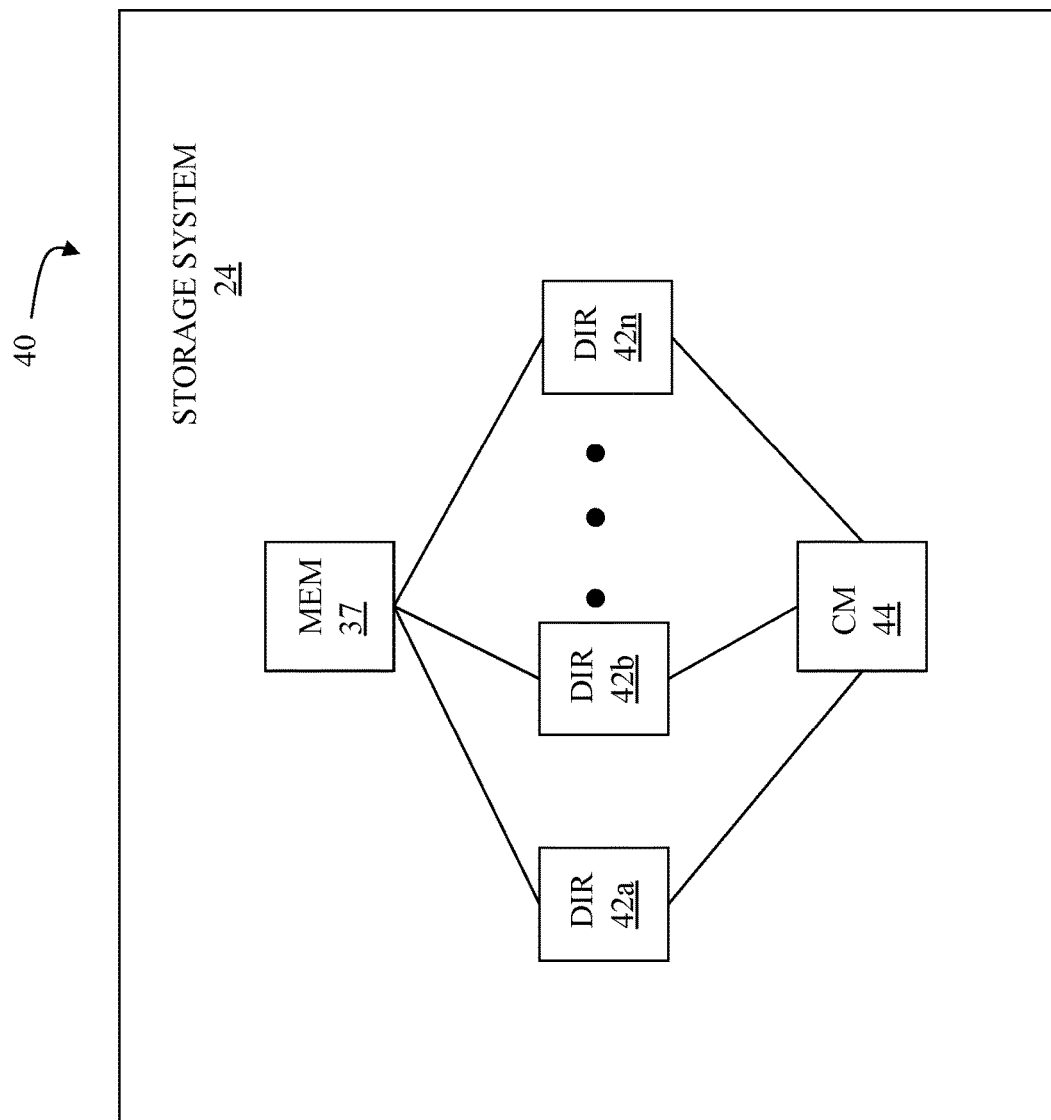
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage systems in a manner that allows reconfiguring connections without having to physically disconnect and reconnect cables from and to ports of the devices. A storage area network may be implemented using one or more switches to which the storage systems and the host devices are coupled. The switches may be programmed to allow connections between specific ports of devices coupled to the switches. A port that can initiate a data-path connection may be called an "initiator" port while the other port may be deemed a "target" port.

Figure 3:
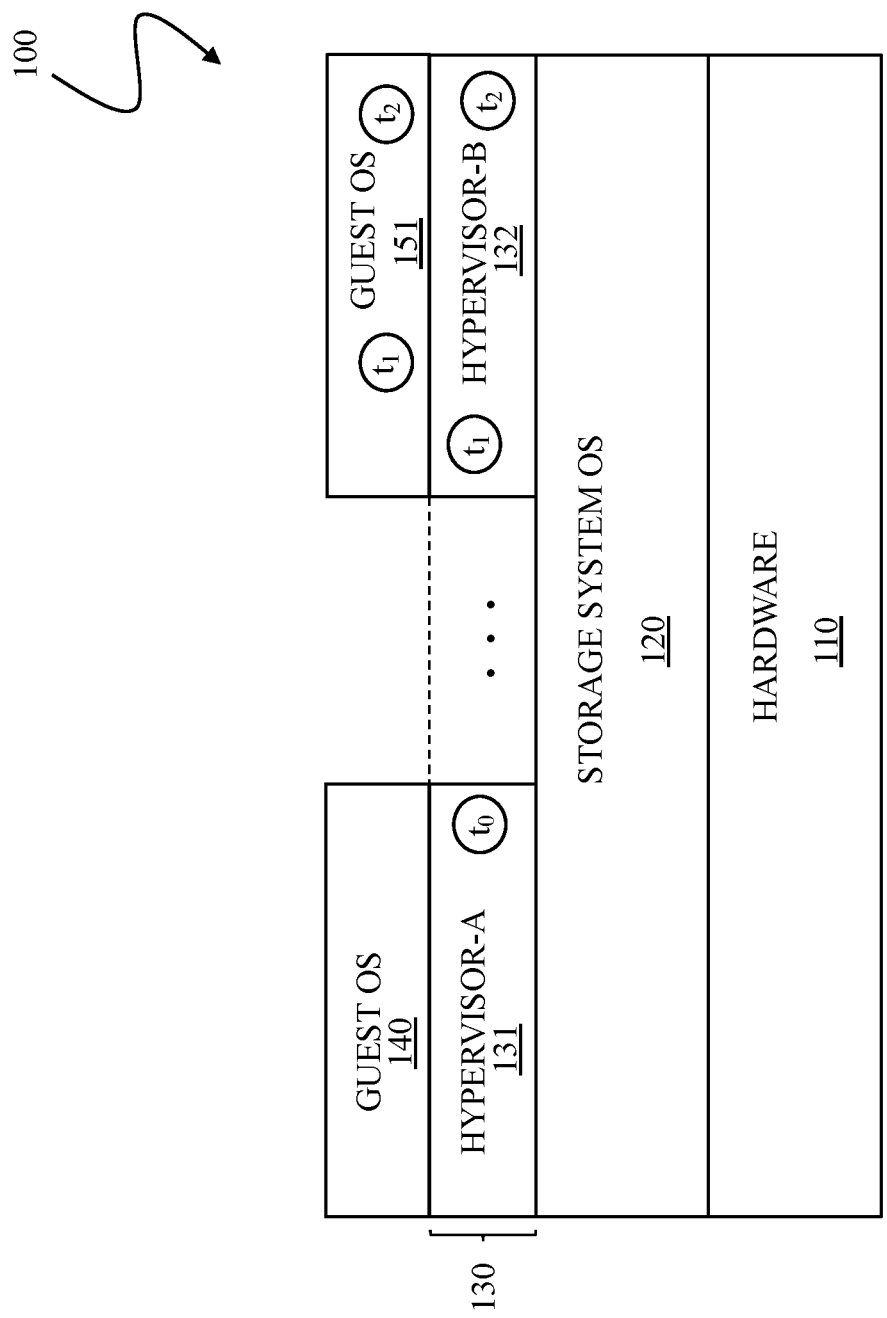
FIG. 3 is a schematic illustration showing hardware and software layers for a storage system, including independent hypervisors as threads, according to an embodiment of the system described herein.

Referring to FIG. 3, a schematic illustration showing hardware and software layers for a storage system 100 that is similar to (or possibly identical to) the storage systems 24, 26 discussed elsewhere herein. The storage system 100 has independent hypervisors as threads, which are described in more detail elsewhere herein. A hardware layer 110 includes hardware components for the storage system 100, such as memory and processors (CPUs) and/or other components like that discussed in connection with FIGS. 1 and 2. A storage system operating system (OS) layer 120 is shown as the operating system for the storage system 100. In an embodiment, the OS layer 120 may be a Symmetrix storage system OS, such as Enginuity, with a Symm/K kernel that provides OS services and scheduling. Other operating systems may be used, such as the Linux operating system.

An instance is a single binary image of an OS that performs a specific set of operations. In an embodiment, there may be up to eight instances configured on a director board at any given time. A thread is a separately schedulable set of code or process of an instance. Threads may be co-operative and/or preemptive, and may be scheduled by the OS. An instance may run on more than one core, that is, an instance may provide a symmetric multiprocessing (SMP) environment to threads running within the instance.

According to the system described herein, a thread may be provided that runs as a hypervisor within the storage system OS environment. As previously discussed, a hypervisor is a software implementation providing a software virtualization environment in which other software may run with the appearance of having full access to the underlying system hardware, but in which such access is actually under the complete control of the hypervisor. The hypervisor running as the OS thread is a container hypervisor. The container hypervisor may manage a virtual hardware environment for a guest operating system (Guest OS), and, in an embodiment, the container hypervisor may run multiple OS threads (e.g., 1 to N threads) within a single instance. The Guest OS is an operating system that may be loaded by a thread of the container hypervisor, and runs in the virtual environment provided by the container hypervisor. The Guest OS may also access real hardware devices attached to a director board using a virtual device provided by the container hypervisor or via a peripheral component interconnect (PCI) pass-through device/driver. There may be multiple container hypervisors running within a single instance at the same time. There may also be multiple container hypervisors running within different instances on the same director board at the same time.

In FIG. 3, a hypervisor layer 130 is shown as including hypervisor-A 131 and hypervisor-B 132 that may be examples of container hypervisors in accordance with the system described herein. Each of the container hypervisors 131, 132 may run as threads embedded within the storage system OS operating environment (the storage system OS 120). The container hypervisor 131 is shown running as a thread to and may be running independently of the container hypervisor 132. The container hypervisor 132 is shown running two threads $t_1$ and $t_2$. These threads may run independently of each other as well as the thread to of the container hypervisor 131. In each case, the threads $t_0$, $t_1$ and $t_2$ of the container hypervisors 131, 132 may run as threads of one or more instances of the storage system OS 120. For example, in an embodiment, the container hypervisors 131, 132 may be threads running as part of an Enginuity instance or a Linux instance. The container hypervisors 131, 132 may be scheduled like any other thread and may be preempted and interrupted as well as started and stopped. Advantageously, since the container hypervisors 131, 132 runs as threads within the storage system OS environment, physical resource sharing of the underlying hardware is already provided for according to the storage system OS scheduling.

According to an embodiment of the system described herein, a Guest OS 140 is loaded using the thread to of the container hypervisor-A 131 and, for example, runs an application in the virtual environment provided thereby. As shown, a Guest OS 151 may be loaded using independent threads $t_1$, $t_2$ of the container hypervisor 132. As further discussed elsewhere herein, threads $t_0$, $t_1$ and $t_2$ may all be run independently of each other. The ability to run a container hypervisor as a storage system OS thread provides that the storage system 100 may run with no performance penalty until the container hypervisor thread is enabled. Even when the hypervisor thread is enabled and running an application in a Guest OS, the performance impact may be controlled. Additionally, developments in physical hardware may be accommodated through a software development process that is decoupled from modifications to the hypervisor code. Accordingly, releases of new storage system code, hypervisor code and Guest OS, and applications code may all be realized in an independent manner.

In various embodiments, the container hypervisors 131, 132 may each provide for one or more of the following features: boot a Guest OS; run the Guest OS as a storage system OS thread (e.g., Symm/K); be scheduled, preemptable, etc.; reset the Guest OS without restarting the instance; allow the Guest OS to access storage systems (e.g., Symmetrix) using a Cut-through Device (CTD); and allow the Guest OS to access the I/O Modules using a PCI pass-through device.

Figure 4:
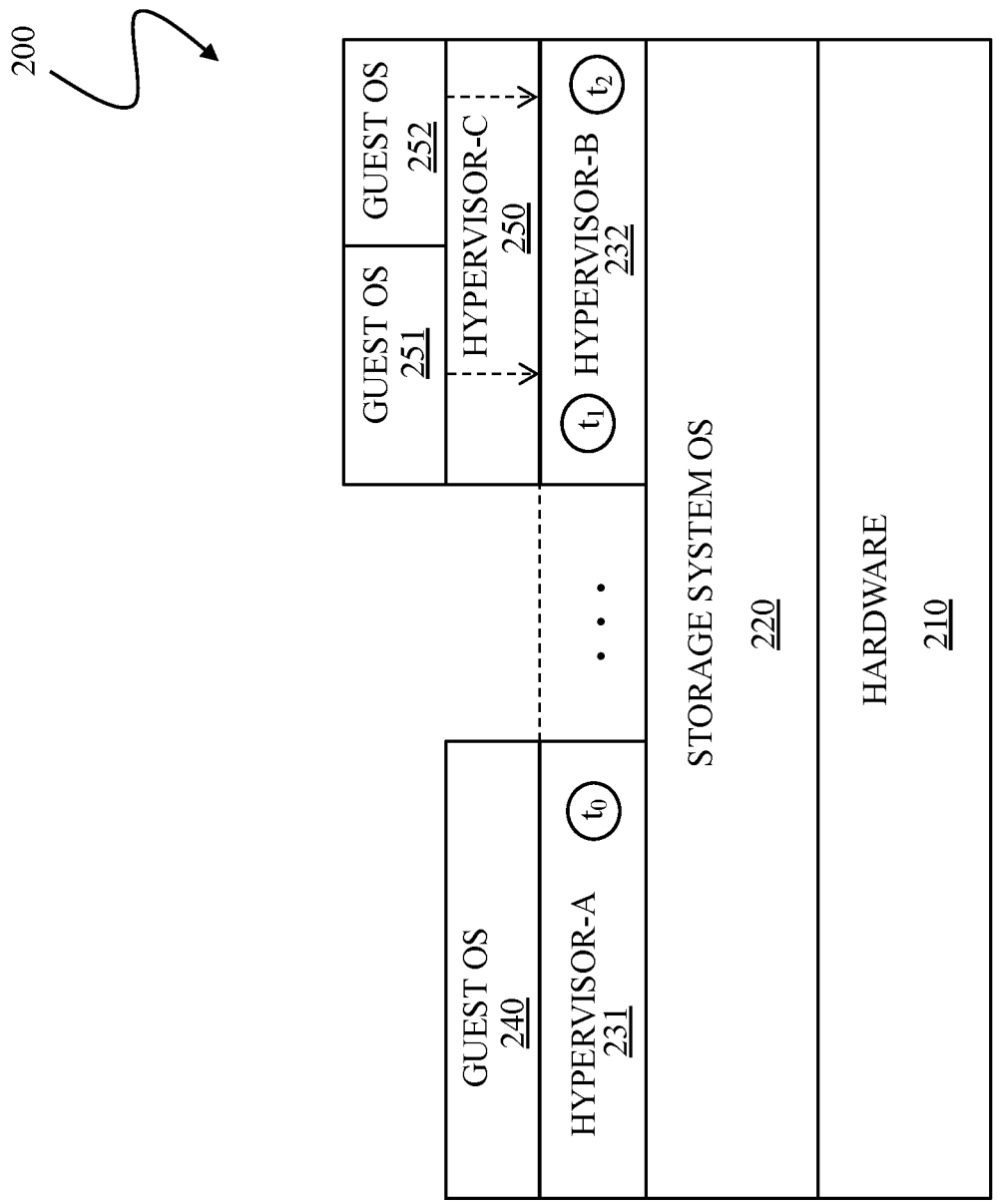
FIG. 4 is a schematic illustration showing a storage system with nested hypervisors according to another embodiment of the system described herein.

Referring to FIG. 4, a schematic illustration shows a storage system 200 with nested hypervisors. The storage system 200 is similar to the storage system 100 discussed elsewhere herein which may include a hardware layer 210 and a storage system OS layer 220. A Guest OS 240 may be loaded using the thread to of a container hypervisor (hypervisor-A) 231. As shown in connection with a container hypervisor (hypervisor-B) 232, the container hypervisor 232 may host one or more other hypervisors (hypervisor-C 250). In various embodiments, the hypervisor-C 250 may be another container hypervisor and/or may be another type of hypervisor, such as an ESXi hypervisor from VMware, Inc. of Palo Alto, Calif. The ability to host another hypervisor (hypervisor-C 250), as a nested hypervisor, provides the capability of the system 200 to host any guest operating system, such as Guest OS's 251, 252 (e.g., Linux) that may be hosted by the hypervisor 250 (e.g., ESXi) itself without needing to modify the code of the container hypervisor 232. It is noted that additional layers of hypervisors may further be nested in accordance with the system described herein. By embedding hypervisors within hypervisors in a storage system environment in the manner according to the system described herein, physical resource sharing may be provided using the storage system OS scheduling and, thereby, resource trampling that may occur with the addition of another hypervisor, without such system OS scheduling, is avoided.

Figure 5:
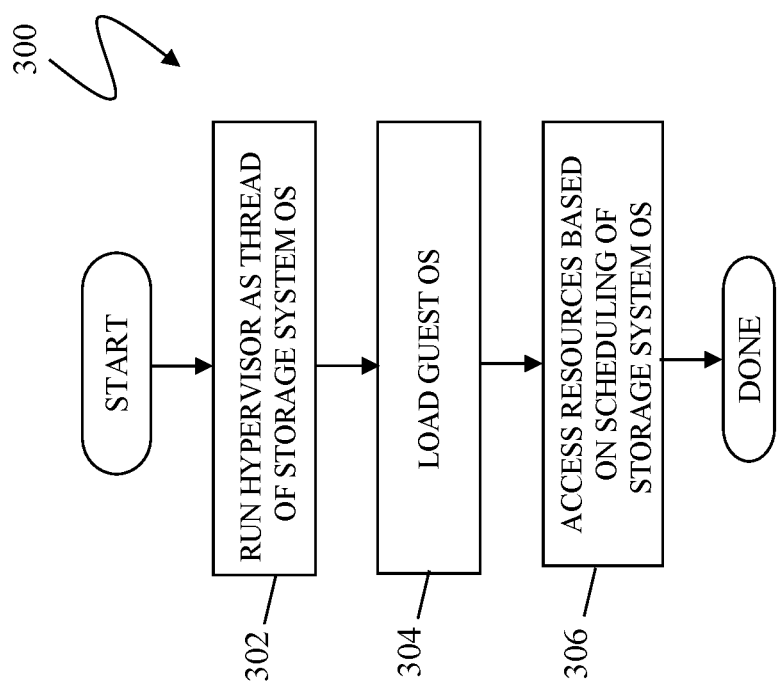
FIG. 5 is a flow diagram showing processing for operating a hypervisor and a guest operating system according to various embodiments of the system described herein.

Referring to FIG. 5, a flow diagram 300 shows processing for operating a hypervisor and a Guest OS according to various embodiments of the system described herein. At a step 302, a container hypervisor is run as a thread of an underlying OS, for example, a storage system OS, such as Enginuity with Symm/K operating a Symmetrix storage system or the Linux operating system. After the step 302, processing proceeds to a step 304 where a Guest OS is loaded using the container hypervisor based on the thread of the storage system OS. The container hypervisor may be run independently of the Guest OS and independently of other hypervisors running as other threads of the storage system OS. After the step 304, processing proceeds to a step 306 where the hypervisor accesses resources according to a scheduler of the storage system OS and in connection with resource requirements of the Guest OS (and/or an application of the Guest OS). As further discussed elsewhere herein, the hypervisor may share resources with the other hypervisors according to the scheduling of the storage system OS. In an embodiment, the container hypervisor may be embedded with the storage system OS. As further discussed elsewhere herein, code of container hypervisor may be modified independently of code of the Guest OS and/or code of other hypervisors running as threads of the storage system OS. After the step 306, processing is complete. One or more of the above-noted processing steps may be implemented via executable code stored on a non-transitory computer readable medium and executable by at least one processor according to an embodiment of the system described herein.

Figure 6:
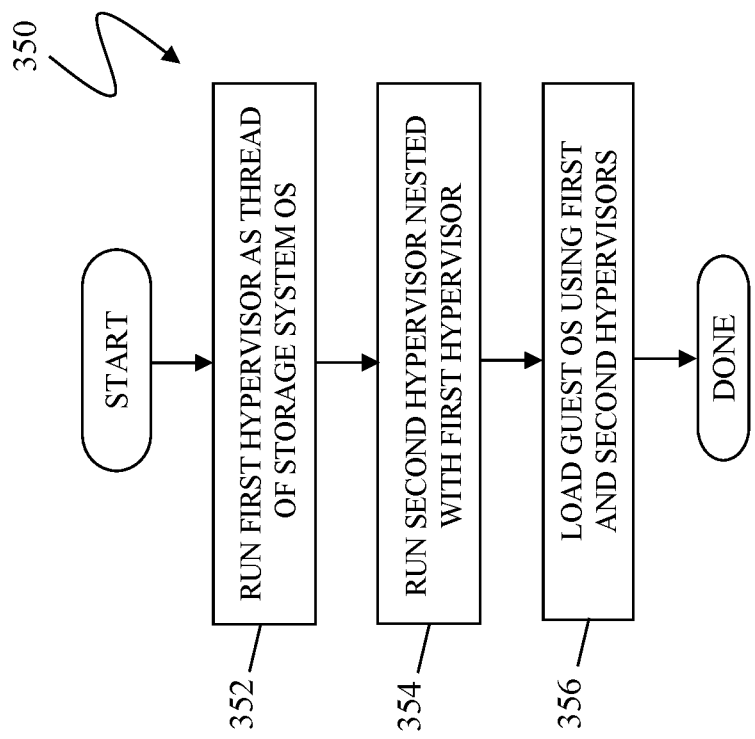
FIG. 6 is a flow diagram showing processing for operating nested hypervisors according to an embodiment of the system described herein.

Referring to FIG. 6, a flow diagram 350 shows processing for operating nested hypervisors according to an embodiment of the system described herein. At a step 352, a container hypervisor (e.g., a first hypervisor) is run as a thread of an underlying OS, for example, a storage system OS, such as Enginuity with Symm/K operating a Symmetrix storage system. After the step 352, processing proceeds to a step 354, where a second hypervisor is run nested, and/or embedded within, the first hypervisor (the container hypervisor). In various embodiments, the second hypervisor may be a known hypervisor (e.g., ESXi) and/or may be another container hypervisor. Other hypervisors may be further nested in accordance with the system described herein. After the step 354, processing proceeds to a step 356, where a Guest OS is loaded using the first (container) hypervisor and the second hypervisor. After the step 356, processing is complete. One or more of the above-noted processing steps may be implemented via executable code stored on a non-transitory computer readable medium and executable by at least one processor according to an embodiment of the system described herein.

According to another embodiment, by using a thread of a container hypervisor in the storage system OS environment (e.g., Enginuity running Symm/K), it is possible for a Guest OS to operate in several modes. The container hypervisor thread may inherit the same number of CPU cores as that of the OS instance and may run as a single thread on those cores when active. However, since the container hypervisor is running as a thread, rather than being scheduled as an OS instance, as described elsewhere herein, other OS threads may also continue to run on other cores in the same SMP environment. The use of the OS scheduling algorithms (e.g., Symm/K) for scheduling the threads of the container hypervisors thus provide the ability to schedule fractions of CPU time on multiple cores for the Guest OS's. Furthermore, it is possible for the container hypervisor to allocate fewer virtual cores than physical cores available to the instance, and allow the Guest OS to operate SMP on those cores while still allowing other OS threads to operate with full CPU core resources, and to adjust the CPU allocation between Guest OS's and other threads. In an embodiment, in a VMAX system from EMC Corporation of Hopkinton, Mass., the granularity of the CPU time scheduling according to the system described herein may be on the order of 500 microseconds or less.

Figure 7:
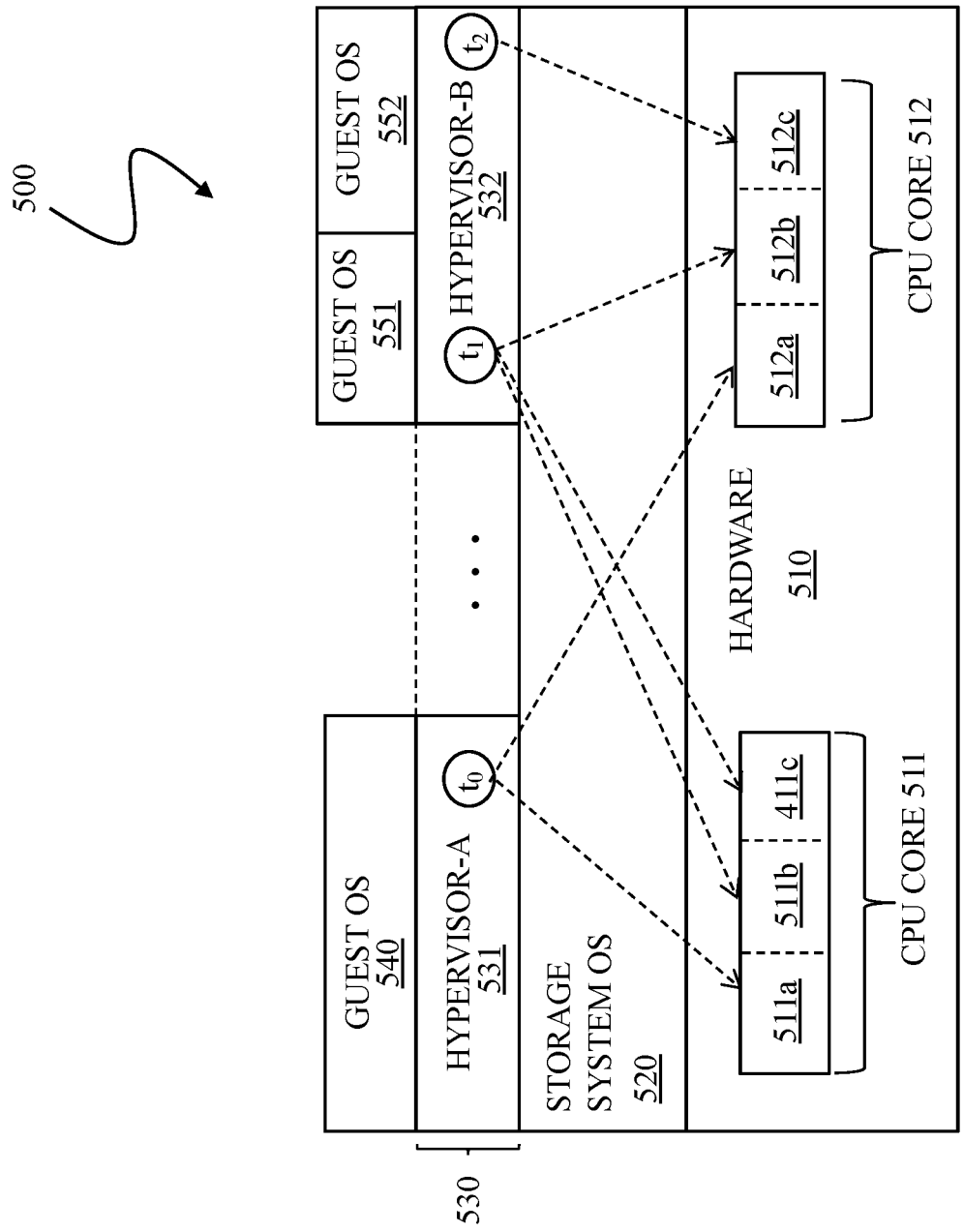
FIG. 7 is a schematic illustration showing a storage system with fractional SMP capabilities extended to one or more guest operating systems according to an embodiment of the system described herein.

Referring to FIG. 7, a schematic illustration shows a storage system 500 that is similar to the storage systems 100, 200 discussed elsewhere herein which may include a hardware layer 510 and a storage system OS layer 520. The storage system 500 has fractional SMP capabilities extended to one or more Guest OS's 540, 551, 552 according to an embodiment of the system described herein. The storage system 500 includes a container hypervisor layer 530, with a container hypervisor 531 (hypervisor-A) and a container hypervisor 532 (hypervisor-B) illustrated by way of example. The Guest OS's 540, 551 and 552 may be loaded using the container hypervisors 531, 532. The container hypervisors 531, 532 map virtual CPU cores to the physical CPU cores 511, 512 of the hardware layer 510. That is, in accordance with the system described herein, the one or more Guest OS's may only have access to a different number of available CPU cores (virtual CPU cores) than are available as physical CPU cores on the hardware 510. Through the use of the container hypervisors 531, 532 running as storage system OS threads $t_0$, $t_1$, and $t_2$ (rather than being scheduled as storage system OS instances), the system described herein provides for the ability to schedule fractions of CPU time on multiple cores for one or more of the Guest OS's 540, 551, 552 according to the scheduling algorithms of the storage system OS components (e.g., Symm/K).

The scheduling of fractional CPU time on the physical CPU cores 511, 512 is shown schematically as fractions 511a-c and 512a-c of each of the CPU cores 511, 512. Each of the threads $t_0$, $t_1$, and $t_2$ of the container hypervisors 531, 532 may operate in an SMP regime on multiple ones of the cores 511, 512 while allowing others of the threads to also operate with full CPU core resources. The system described herein provides for flexible control of physical CPU allocation between Guest OS's 540, 551, 552 without causing one or more of the Guest OS's 540, 551, 552 to become inactive due to resource overlaps. In this way, the Guest OS's 540, 551, 552 may run based on the threads of the container hypervisors 531, 532 using varying amounts of CPU time per CPU core in an SMP regime.

Each of the hypervisors and the base OS of a storage system may schedule and run one or more threads that compete for resources of the storage system, including use of the CPU cores of the system. It is desirable to be able to dynamically allocate CPU cores to each of the threads according to the workloads of each of the threads at different times. Thus, for example, a particular thread may be allocated more cores during a time when the thread has a relatively heavy workload than when the thread has a relatively light workload. Ideally, the dynamic allocation would occur prior to the change in workload so that, for example, if it is expected that a thread will experience a significant workload increase at a particular time, it would be desirable to allocate additional cores to the thread just prior to the particular time in anticipation of the increased workload. Note also that, in some cases, allocating cores is a zero sum game where allocating resources to one thread deallocates the same resources from one or more other threads. Thus, it is useful to be able to predict activity for all of the threads of a system to be able to allocate cores to threads that are expected to be more active and to deallocate cores from threads that are expected to be less active. The system described herein uses a core allocation model with machine learning and artificial intelligence to provide a mechanism that allocates and deallocates cores to threads in anticipation of workloads of the threads.

Figure 8B:
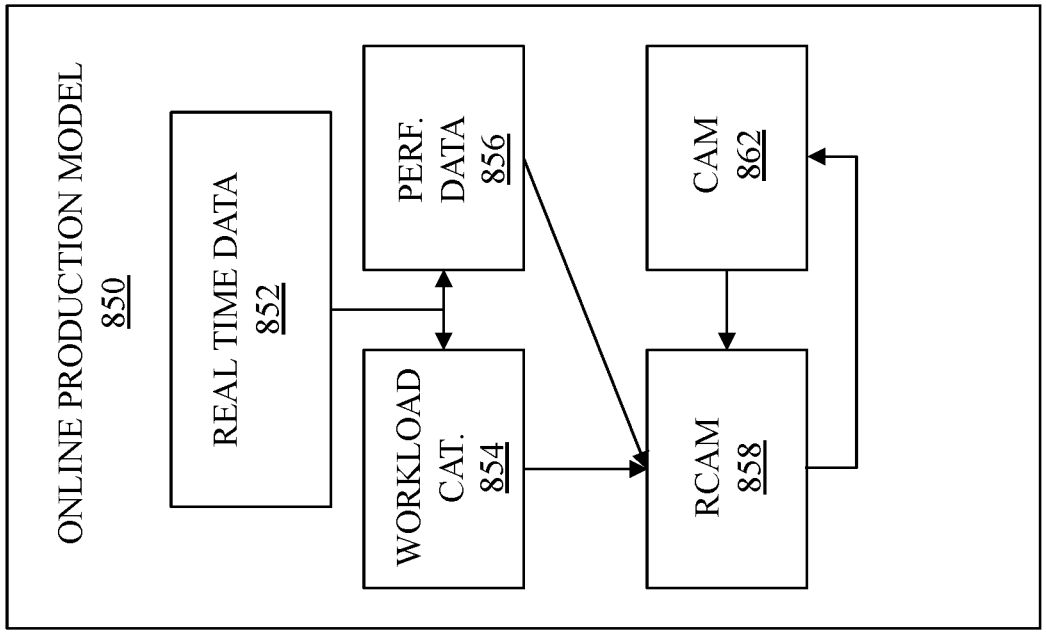
FIG. 8B is a schematic diagram illustrating an online production model according to an embodiment of the system described herein.
Figure 8A:
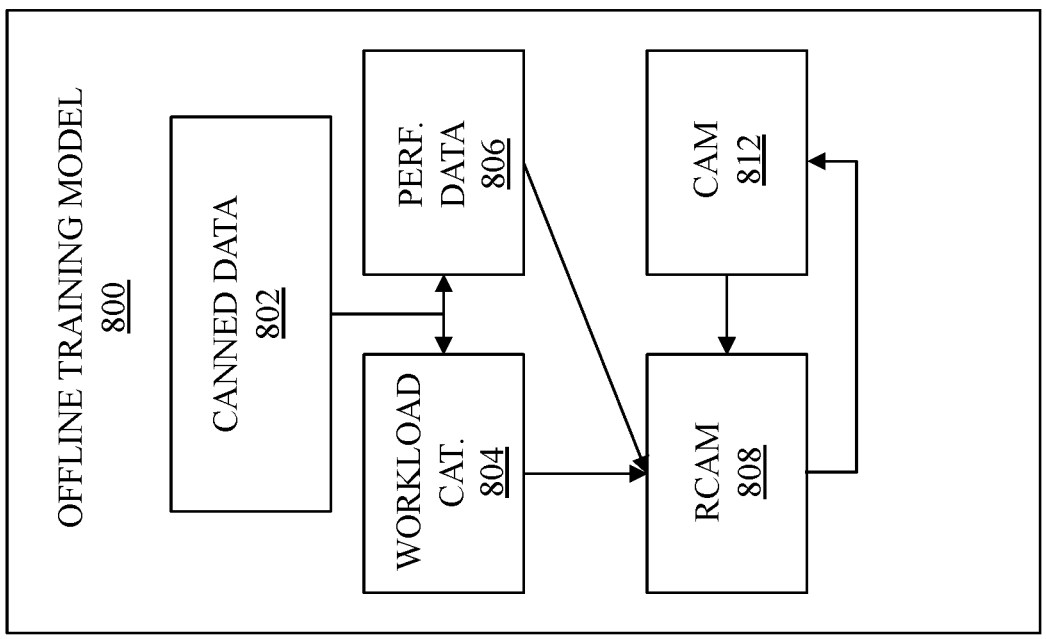
FIG. 8A is a schematic diagram illustrating an offline training model according to an embodiment of the system described herein.

Referring to FIG. 8A, an offline training model 800 includes canned customer data 802, which is data from I/O workloads that was previously obtained at customer sites and includes information such as I/O rates, thread execution times, system response times, Logical block address(es) (LBA), etc. The canned customer data 802 may be field-support data from storage systems of a number of customers. Using field support data rather than specific data at each customer site may reduce the model initial training period of a newly installed system. In some embodiments, the canned customer data 802 may be a combination of generic field support data and some percentage (e.g., 10%) of data from a specific customer for whom the core allocation model is being provided.

The canned customer data 802 is provided to a workload analyzer 804, which may be implemented using a Deep Neural Network (DNN) that categorizes different workloads according to patterns in the canned customer data 802 detected by the DNN. The workload analyzer 804 derives a set of categories that represent workloads having closely related behavior profiles. The set of categories allow aggregation of complex system operations into a much smaller set of features that can be used as labels for subsequent processing stages. The canned customer data 802 also provides performance data 806 that corresponds to performance-related parameters, such as I/O latencies (detected at a host) and IOPS, along with a number of cores allocated in each situation.

The workload categories from the workload analyzer 804 and the performance data 806 are used to label time-sequenced performance data and provide the result thereof to a recurrent core allocation model 808, which is a Recurrent Neural Network (RNN) that iteratively determines an optimal number of cores to allocate to threads corresponding to different workloads. Examples of data output from the workload analyzer 804 (DNN) that is processed by the recurrent core allocation model 808 (RNN) may include elements such as read probability, pattern signature(s), LBA range, block rate(s), etc. The output of the recurrent core allocation model 808 includes core counts that may be applied to each situation (workload category) that maximizes system performance for a next sample period. Maximizing system performance includes reducing read and write latency times and increasing data throughput rates. A core allocations module 812 represents different permutations of core allocations that are provided as input to the recurrent core allocation model 808. The core allocations module 812 also receives the results from the recurrent core allocation model 808 for each iteration.

The offline training model 800 iteratively processes the canned customer data 802 to produce a table that contains workload characterizations (categories) and corresponding core allocations. As explained in more detail elsewhere herein, the table may be used during runtime to set initial core allocations for threads, but the number of cores for a thread may be dynamically adjusted. In some cases, however, the dynamic adjustments are constrained to inhibit significant changes while a thread is running.

Referring to FIG. 8B, an online production model 850 is similar to the offline training model 800. The online production model 850 uses actual customer workload data 852 provided in real time to obtain, using a DNN, performance data 854 and workload categorization data 856 which is similar to the performance data 804 and the workload categorization data 806 of the offline training model 800. The workload categorization data 854 is used with the table (described above) generated by the offline training model 800 to set an initial number of cores to be allocated for threads.

The output categories from the workload analyzer 854 and the performance data 856 are used to provide labeled time-sequenced performance data to a recurrent core allocation model 858, which is a Recurrent Neural Network (RNN) that iteratively determines an optimal number of cores to allocate to threads corresponding to workloads that are currently running. The recurrent core allocation model 858 is similar to the recurrent core allocation model 808 of the offline training model 800. The output of the recurrent core allocation model 858 includes core counts that may be applied to a current workload that will maximize performance for a next period. A core allocations module 862 represents different permutations of core allocations that are provided as input to the recurrent core allocation model 858. The core allocations module 862 also receives the results from the recurrent core allocation model 858 for each iteration.

In an embodiment herein, the output of the recurrent core allocation model 858 is used to adjust a number of cores for threads currently running in a storage system. However, as discussed in more detail elsewhere herein, the amount of adjustment for each iteration is restricted. For example, the number of cores for iteration i may be given by:

$$NC_i = NC_{i-1} + (OMC - NC_{i-1})/DF$$

where $NC_i$ is a number of cores for a current iteration, $NC_{i-1}$ is a number of cores for a previous iteration, OMC is a number of cores determined by the online production model (described above), and DF is a damping factor that ranges from one to infinity. The value for DF may be set according to empirical observations of a system and other functional factors. Note that, as DF increases, the value for $NC_i$ changes more slowly between iterations. In an embodiment herein, DF is ten, but of course other values may be used.

Figures 9, 10:
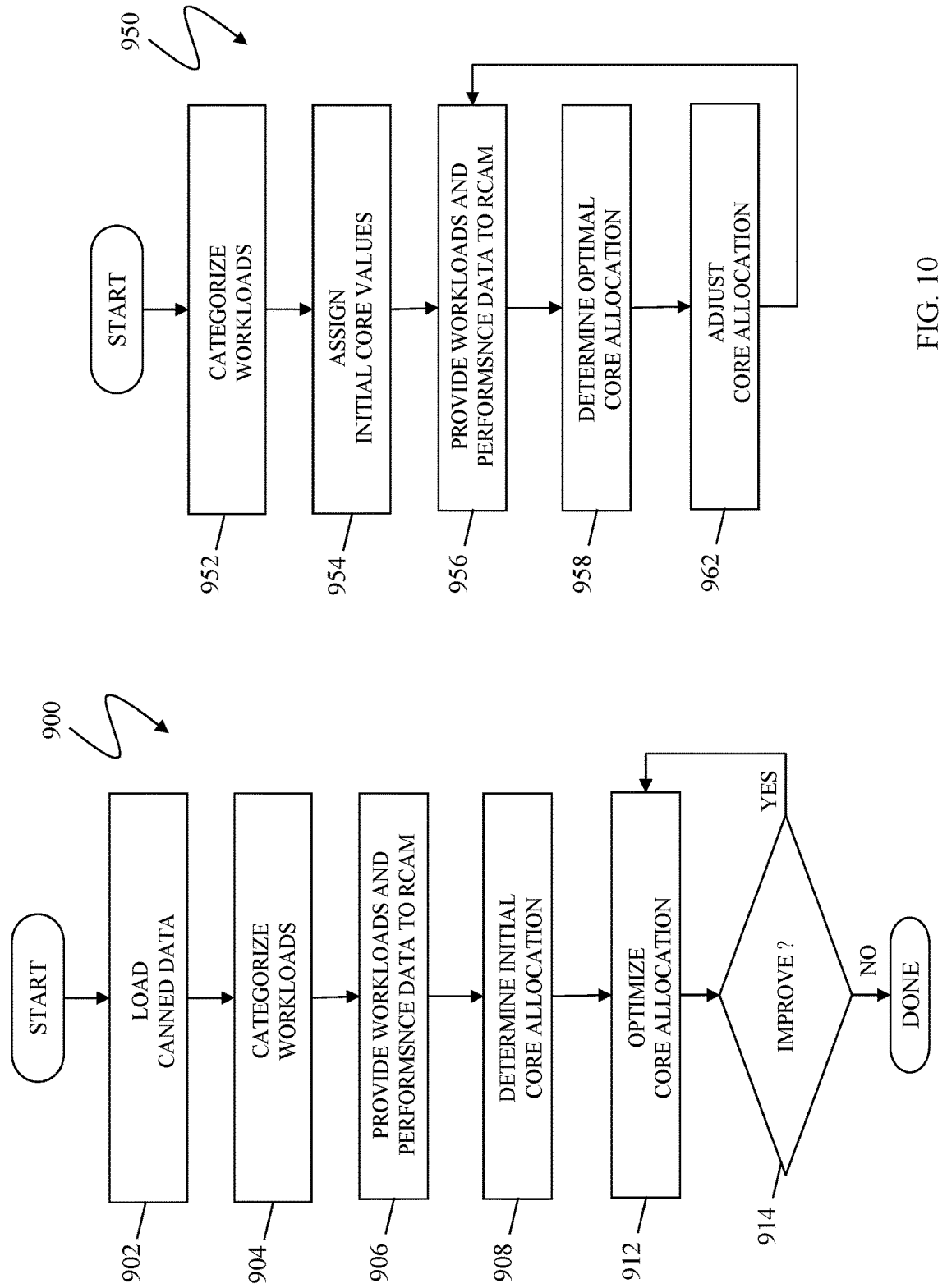
FIG. 9 is a flow diagram showing processes for an offline training model according to an embodiment of the system described herein.
FIG. 10 is a flow diagram showing processes for an online production model according to an embodiment of the system described herein.

Referring to FIG. 9, a flow diagram 900 illustrates processing performed by the offline training model 800, described above, in connection with determining numbers of cores to initially assigned to different categories of workloads. Processing begins at a first step 902 where the canned data 802 is loaded into the offline training model 800. As discussed elsewhere herein, the canned data 802 includes field-support data for a number of customers and may also include some percentage (e.g., 10%) of data from a specific customer for whom the core allocation model is being provided. Following the step 902 is a step 904 where the different workloads provided in the canned data 802 is categorized by the workload categorizer 804 using a deep neural network (DNN) or some other appropriate technology capable of analyzing the canned data 802. Following the step 904 is a step 906 where the workload categories and the performance data 806 from the canned data 802 are provided to the recurrent core allocation model 808, discussed above. Following the step 906 is a step 908 where the recurrent core allocation model 808 makes an initial determination as to the number of cores to assign to different categories of workloads.

Following the step 908 is a step 912 where the recurrent core allocation model 808 improves the selection of the number of cores for each of the workloads. The recurrent core allocation model 808 essentially runs iteratively (using the core allocations module 812) to attempt to continuously improve (optimize) the number of cores assigned to each workload category using the workload categories and the performance data from the canned data 802. Note that since there are only a finite number of cores that can be allocated at any one time, allocating an additional core (or fraction of a core) to one thread deallocates the core (or fraction of a core) for another thread. Following the step 912 is a test step 914 where it is determined if the attempt at optimization at the step 912 improved overall system performance. If not, then processing is complete because there is apparently no more optimization. Otherwise, control transfers back to the step 912, described above, for another iteration of optimization.

Referring to FIG. 10, a flow diagram 950 indicates processing performed by the online production model 850 in connection with adjusting core allocations for threads of a system using real time data. Processing begins at a first step 952 where workloads of threads are categorized using, for example, the workload categorizer 856, described above. Following the step 952 is a step 954 where initial core values are assigned to threads according to the table, described above, generated by the offline training model 800. Following the step 954 is a step 956 where real time data, including workload categories and performance data, is provided to the recurrent core allocation model 858, described above. Following the step 956 is a step 958 where the recurrent core allocation model 858 determines optimal core allocations based on current operational real time data, as described elsewhere herein. Following the step 958 is a step 962 where numbers of cores allocated to the various threads are adjusted, as described elsewhere herein. Following the step 962, control transfers back to the step 956, described above, for another iteration.

The system described herein may be implemented using any system that supports multiple concurrent threads. Of course, in systems that are not storage systems, the training data needs to be adjusted to whatever data is appropriate for the system being used. Essentially, the training data used for the training model 800 should be the same type of data that is expected to be processed for the online production model.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of allocating cores to workloads of threads running on one or more processors in a storage system, comprising:
   training a first model to optimize core allocations to the workloads of threads using training data that includes data from a site that is expected to run a second model;
   categorizing, by the first model, the workloads of threads to different categories of the workloads of threads;
   initially allocating at least some of the cores to the different categories of the workloads of threads based on information provided by the first model;
   determining a potential number of cores to allocate to each of the different categories of the workloads of threads based on the second model that uses run time data and run time performance measurements corresponding to workloads that are currently running;
   performing a plurality of iterations to dynamically adjust the core allocations to the workloads of threads by repeatedly determining the potential number of cores to allocate and adjusting the potential number of cores that are allocated at each iteration by:
      adjusting, by the second model, the potential number of cores to allocate to the workloads of threads using an adjustment factor that corresponds to a difference divided by a damping factor, wherein the damping factor is greater than one, and a value for the damping factor may be set according to empirical observations of the storage system and other functional factors, and wherein the difference is the determined value of the potential number of the cores to allocate based on the second model minus a number of the cores allocated from a previous iteration.

2. The method, according to claim 1, wherein the training data includes I/O workload data obtained at customer sites and wherein the I/O workload data includes data about I/O rates, thread execution times, system response times, and Logical Block Addresses.

3. The method, according to claim 1, wherein the workloads of threads are threads of a hypervisor running on the storage system.

4. The method, according to claim 3, wherein the hypervisor manages one or more guest operating systems.

5. A non-transitory computer readable medium containing software that allocates cores to workloads of threads running on one or more processors in a storage system, the software comprising:
   executable code that trains a first model to optimize core allocations to the workloads of threads using training data that includes data from a site that is expected to run a second model;
   executable code that categorizes, by the first model, the workloads of threads to different categories of the workloads of threads;
   executable code that initially allocates at least some of the cores to the different categories of the workloads of threads based on information provided by the first model;
   executable code that determines a potential number of cores to allocate to each of the different categories of the workloads of threads based on the second model that uses run time data and run time performance measurements corresponding to workloads that are currently running;
   executable code that performs a plurality of iterations to dynamically adjust the core allocations to the workloads of threads by repeatedly determining the potential number of cores to allocate and adjusting the potential number of cores that are allocated at each iteration by:
      adjusting, by the second model, the potential number of cores to allocate to the workloads of threads using an adjustment factor that corresponds to a difference divided by a damping factor, wherein the damping factor is greater than one, and a value for the damping factor may be set according to empirical observations of the storage system and other functional factors, and wherein the difference is the determined value of the potential number of the cores to allocate based on the second model minus a number of the cores allocated from a previous iteration.

6. The non-transitory computer readable medium, according to claim 5, wherein the training data includes I/O workload data obtained at customer sites and wherein the I/O workload data includes data about I/O rates, thread execution times, system response times, and Logical Block Addresses.

7. The non-transitory computer readable medium, according to claim 5, wherein the workloads of threads are threads of a hypervisor running on the storage system.

8. The non-transitory computer readable medium, according to claim 7, wherein the hypervisor manages one or more guest operating systems.

9. A storage system, comprising:
   a plurality of interconnected director boards, each having at least one of CPUs and providing functionality for at least one of: a host adaptor that exchanges data with one of more hosts coupled to the storage system, a disk adaptor that exchanges data with one or more physical storage units of the storage system, and a remote adaptor that exchanges data with one or more remote storage systems;
   a memory coupled to the plurality of interconnected director boards; and
   a non-transitory computer-readable medium containing software that is executed by the at least one of the CPUs on the plurality of interconnected director boards, the software including executable code that trains a first model to optimize core allocations to workloads of threads running in the storage system using training data that includes data from a site that is expected to run a second model, executable code that categorizes, by the first model, the workloads of threads to different categories of the workloads of threads, executable code that initially allocates at least some of the cores to the different categories of the workloads of threads based on information provided by the first model, executable code that determines a potential number of cores to allocate to each of the different categories of the workloads of threads based on the second model that uses run time data and run time performance measurements corresponding to workloads that are currently running, executable code that performs a plurality of iterations to dynamically adjust the core allocations to the workloads of threads by repeatedly determining the potential number of cores to allocate and adjusting the potential number of cores that are allocated at each iteration by: adjusting, by the second model, the potential number of cores to allocate to the workloads of threads using an adjustment factor that corresponds to a difference divided by a damping factor, wherein the damping factor is greater than one, and a value for the damping factor may be set according to empirical observations of the storage system and other functional factors, and wherein the difference is the determined value of the potential number of the cores to allocate based on the second model minus a number of the cores allocated from a previous iteration.

10. The storage system, according to claim 9, wherein the training data includes I/O workload data obtained at customer sites and wherein the I/O workload data includes data about I/O rates, thread execution times, system response times, and Logical Block Addresses.

11. The storage system, according to claim 9, wherein the workloads of threads are threads of a hypervisor running on the storage system and wherein the hypervisor manages one or more guest operating systems.

* * * * *